(12) United States Patent
Ongaro et al.

(10) Patent No.: US 10,348,198 B2
(45) Date of Patent: Jul. 9, 2019

(54) SYSTEMS AND METHODS FOR GENERATING A FEEDBACK CURRENT IN A DC-DC CONVERTER

(71) Applicant: Apple Inc., Cupertino, CA (US)

(72) Inventors: Fabio Ongaro, Munich (DE); Michael Couleur, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/691,461

(22) Filed: Aug. 30, 2017

(65) Prior Publication Data

US 2019/0068054 A1   Feb. 28, 2019

(51) Int. Cl.
| | |
|---|---|
| *H02M 3/156* | (2006.01) |
| *H02M 1/08* | (2006.01) |
| *H02M 1/00* | (2006.01) |

(52) U.S. Cl.
CPC ............ *H02M 3/156* (2013.01); *H02M 1/08* (2013.01); *H02M 2001/0048* (2013.01)

(58) Field of Classification Search
CPC . H02M 3/156; H02M 1/08; H02M 2001/0048
See application file for complete search history.

(56) References Cited

U.S. PATENT DOCUMENTS

| | | | |
|---|---|---|---|
| 6,377,032 B1 * | 4/2002 | Andruzzi | H02M 3/1588 323/224 |
| 6,583,610 B2 | 6/2003 | Groom et al. | |
| 7,045,993 B1 * | 5/2006 | Tomiyoshi | H02M 3/1588 323/224 |
| 7,477,045 B2 | 1/2009 | Schuellein et al. | |
| 8,879,217 B2 | 11/2014 | Tang et al. | |
| 8,981,753 B2 | 3/2015 | Giannopoulos | |
| 9,362,829 B2 | 6/2016 | Liu et al. | |
| 2006/0017424 A1 * | 1/2006 | Wood | H02M 3/156 323/274 |
| 2012/0235652 A1 | 9/2012 | Sheng et al. | |
| 2013/0119961 A1 | 5/2013 | Okuda et al. | |
| 2015/0097542 A1 | 4/2015 | Repton et al. | |
| 2015/0288285 A1 | 10/2015 | Paul et al. | |
| 2016/0013713 A1 | 1/2016 | Li et al. | |
| 2016/0085251 A1 | 3/2016 | Sumitomo | |
| 2016/0204704 A1 | 7/2016 | Cao | |
| 2017/0090501 A1 | 3/2017 | Fletcher et al. | |

\* cited by examiner

*Primary Examiner* — Jue Zhang
(74) *Attorney, Agent, or Firm* — Meyertons Hood Kivlin Kowert and Goetzel PC; Rory D. Rankin (57) ABSTRACT

Systems, apparatuses, and methods for generating a stable output voltage for one or more components by checking feedback information for an entire clock period are described. In various embodiments, a power converter generates an output voltage for one or more components. When the load current drawn by the one or more components changes, an inductor current of a low pass filter and monitored by a current sense amplifier also changes. The clock period is divided into a high phase and a low phase with one of the phases being a relatively short phase. During the relatively short phase, the current sense amplifier does not have sufficient time to measure feedback information. Instead of selecting a voltage output of the current sense amplifier, control logic selects a voltage output of a voltage generator, which emulates a voltage ramp with a slope of the inductor current during the relatively short phase.

20 Claims, 6 Drawing Sheets

SYSTEMS AND METHODS FOR GENERATING A FEEDBACK CURRENT IN A DC-DC CONVERTER

BACKGROUND

Technical Field

Embodiments described herein relate to the field of integrated circuits and, more particularly, to generating a stable output voltage for one or more components by monitoring feedback information for a clock period.

Description of the Related Art

Computing systems typically includes multiple components, many of which are capable of processing data. These multiple components include interface and functional blocks or units. In various embodiments, these multiple components are individual dies on one of a system on a chip (SOC), a multi-chip module (MCM), or a printed circuit board. Examples of such components are general-purpose processors with one or more cores in a central processing unit (CPU), highly parallel data architected processors with one or more cores in graphics processing units (GPUs) and digital signal processors (DSPs), display controllers, audio processing components, networking components, peripheral interface controllers, memory controllers, and so on.

Control logic, such as a power management unit, within the computing system determines one or more operating states for the different components. The operating state includes a power supply voltage and an operational clock frequency. Clock generating circuitry generates different clock signals at the one or more specified different frequencies, whereas a power distribution network provides the one or more specified different power supply voltages. This on-chip network uses power supplies and regulation circuits to generate the specified different power supply voltages for use by the devices within the functional units. Additionally, the network may rely on a pair of on-chip planes (e.g., metal layers) where one plane (a "power plane") is dedicated to a power supply voltage and another plane (a "ground place") is dedicated to a ground value.

When devices in the components draw current from the power and ground planes, the changes in the demand of current creates both a current-resistance (IR) drop and a transient voltage drop. Additionally, for battery powered devices, such as mobile devices, a voltage value provided by a battery reduces as the stored energy is consumed. Although the duration of the voltage variation may be temporary, the voltage variation can cause unreliable behavior for devices in the system. Generally speaking, power converters are used to monitor feedback information and provide a stable output voltage. However, in many cases circuitry used to provide the feedback information does not have adequate time to properly provide the feedback information.

In view of the above, methods and mechanisms for generating a stable output voltage for one or more components by checking feedback information for an entire clock period are desired.

SUMMARY

Systems and methods for generating a stable output voltage for one or more components by checking feedback information for an entire clock period are disclosed. In various embodiments, a power converter receives an input voltage and generates an output voltage on a capacitor of a low pass filter. The output voltage is sent to one or more components such as a central processing unit (CPU), a graphics processing unit (GPU), and so forth. The power converter includes two power transistors connected in series with an output connected to the low pass filter. A driver within the power converter turns on and off the two power transistors based at least upon changes in the inductor current. The average value of the inductor current is the value of the supplied load current. When the load current drawn by the one or more components changes while the output voltage should remain at a same value, the inductor current also changes, which is monitored by a current feedback circuit.

The current feedback circuit includes a current sense amplifier, which receives the inductor current and generates a sensing current as a scaled down version of the inductor current to be sent to one or more comparators. A scaled down version of a given current is a current with reduced amperage compared to the given current. For example, in one embodiment a scaled down version of a given current is a current equal to the given current divided by a factor K. For example, when K is 1,000 and the inductor current is 3 amperes (A), the sensing current is 3 milliamperes (mA). The clock period is divided into a high phase and a low phase with one of the phases being a relatively short phase. When the load current changes, the inductor current also changes since it is proportional to the load current. When the inductor current signal exceeds a given threshold, one of the comparators adjusts the control signal to the two power transistors, which also adjusts the amount of time for the short phase of the clock period when the high side transistor of the two power transistors is turned. Adjusting the amount of time the high side transistor is turned on also adjusts the output voltage.

During the relatively short phase, one or more components, such as the current sense amplifier, do not have sufficient time to start and measure feedback information. Therefore, control logic in the current feedback circuit selects a first voltage from the current sense amplifier to send to a pulse width modulator (PWM) comparator in the controller, when the control logic determines the power converter is in the long phase of the clock period. However, when the control logic determines the power converter is in the relatively short phase of the clock period, the control logic selects a second voltage from a voltage generator to send to the PWM comparator in the controller. Therefore, the current sense amplifier is not relied upon during the relatively short phase. Rather, an emulated voltage ramp mimics the slope of the inductor current during the relatively short phase.

In various embodiments, the voltage generator is a current source connected in series with a capacitor. The current source charges the capacitor to generate the second voltage. The current source generates a current proportional to a difference between an input voltage and an output voltage of the power converter. The second voltage provided by the current source is a voltage ramp on the capacitor, which is an image of the inductor current during the relatively short phase of the clock period. Therefore, a default constant voltage value based on a peak value for the sensing current is not sent to one or more comparators for determining whether one or more thresholds have been reached during the relatively short phase. Instead, the second voltage based on an image of the inductor current is used for the comparisons to the one or more thresholds. In some embodiments, selection by the control logic between the first voltage and the second voltage is performed with switches. In other embodiments, a multiplexer circuit is used for the selection.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
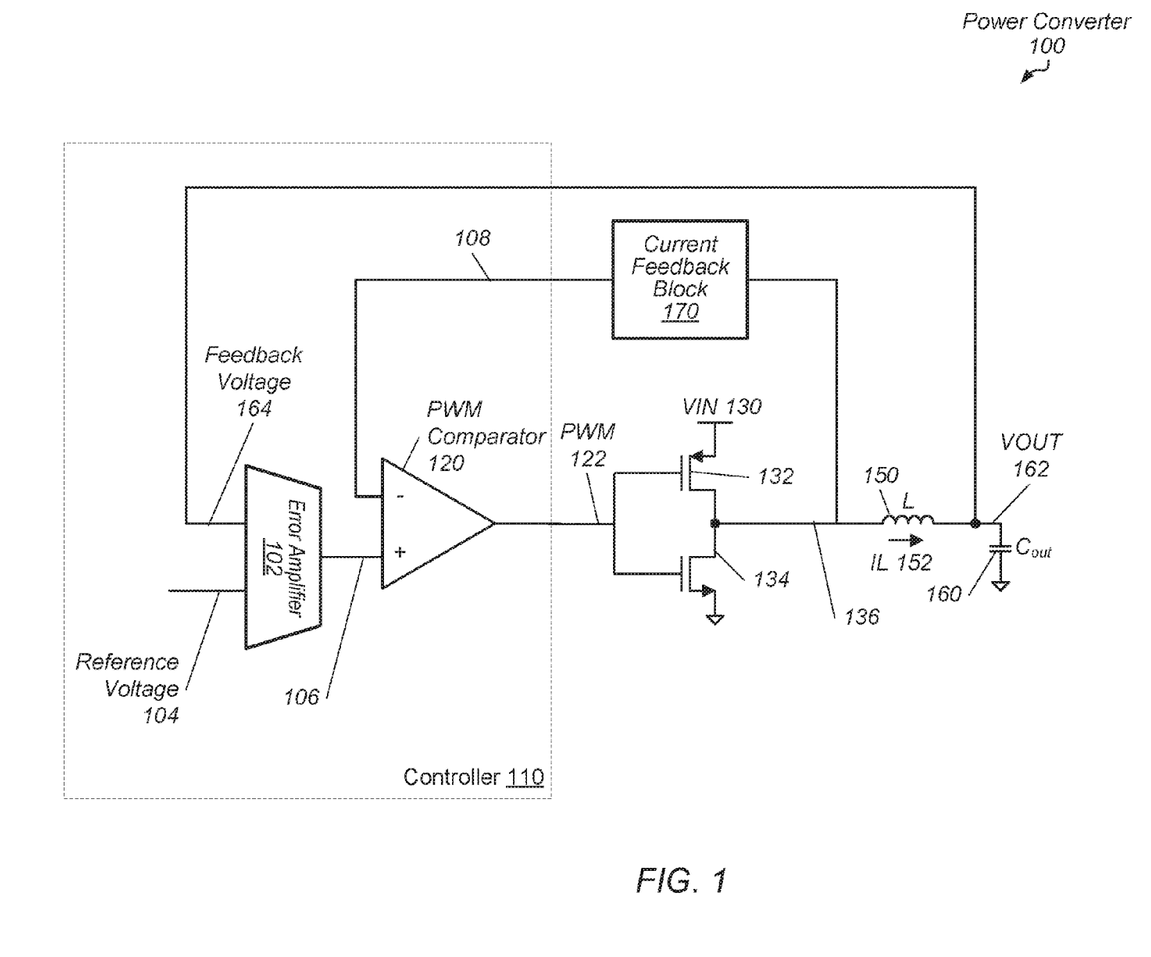
FIG. 1 is a block diagram of one embodiment of a power converter.

Turning now to FIG. 1, a generalized block diagram of one embodiment of a power converter 100 is shown. In the illustrated embodiment, the power converter 100 includes a controller 110, a high-side transistor 132, a low-side transistor 134, a current feedback block 170, and a low pass filter with an inductor 150 and a capacitor 160. The controller 110 includes at least an error amplifier 102 and a pulse width modulator (PWM) comparator 120. Passive elements, such as resistors and capacitors, used to convert a current to a voltage are not shown for ease of illustration. In various embodiments, power converter 100 converts the relatively high input voltage (VIN) 130 to a relatively smaller and regulated output voltage (VOUT) 162 on the capacitor 160 of the low pass filter. The output voltage VOUT 162 is sent to one or more components such as a central processing unit (CPU), a graphics processing unit (GPU), other individual dies on one of a system on a chip (SOC), and so forth.

In some embodiments, power converter 100 is used within a mobile device in an attempt to maximize battery life while supplying the regulated VOUT 162. In an embodiment, power converter 100 provides the stepdown (buck) switching characteristics of a valley control, current mode Buck converter. In one embodiment, controller 110 is a fixed-frequency pulse-width modulation (PWM) controller for direct current (DC) to DC converter applications. Since the controller 110 operates at a specified known frequency, the design of other circuitry for suppressing electromagnetic interference (EMI) becomes relatively simpler.

In some embodiments, each of the high-side transistor 132 and the low-side transistor 134 is a power field effect transistor (FET). For example, the high-side transistor 132 is a power p-type FET (pfet) and the low-side transistor 134 is a power n-type FET (nfet). When the transistor 132 is on and the transistor 134 is off, current flows from the input voltage (VIN) 130 through the inductor 150 and charges the capacitor 160. The current flows with a positive slope. In the alternate case, when the transistor 132 is off and the transistor 134 is on, the capacitor 160 is discharged. In the alternate case, most of the inductor current flows from the ground reference to the capacitor 160 and a relatively small portion of the current flows from the current feedback block 170 to the capacitor 160.

In some embodiments, the peak current through the inductor 150 is used to determine the size of the inductor 150, since both are related to the saturation-current rating of the inductor 150. The capacitor 160 minimizes voltage overshoot and ripple on VOUT 162. Sizing of the capacitor 160 depends on avoiding insufficient output capacitance, which causes both voltage overshoot and voltage ripple on VOUT 162. The voltage ripple is also dependent on a relatively high equivalent-series resistance (ESR) in the capacitor 160. Therefore, any series ESR is designed to be relatively low.

In various embodiments, a driver within controller 110 turns on and off the two power transistors 132 and 134 based at least upon changes in the inductor current IL 152. The average value of the inductor current IL 152 is the value of the supplied load current to one or more components. When the load current drawn by the one or more components changes while the output voltage VOUT 162 remains at a relatively same value, the inductor current IL 152 also changes, which is monitored by the current feedback block 170.

As used herein, when a value reaches a state for enabling evaluation, the value is determined to be asserted. In one example, the pulse-width modulation (PWM) signal 122 having a logic low value enables the high side transistor 132 to conduct current and charge the output node 136 on its drain terminal, which increases the voltage on node 136. In such a case, the signal 122 is determined to be asserted. The logic low value is used as the state in this case to qualify the signal 122 as being asserted. In contrast, the signal 122 having a logic high value disables the high side transistor 132 from conducting current. In such a case, the signal 122 is determined to be negated.

In some embodiments, when controller 110 generates a logic high value for the output signal PWM 122, controller 110 simultaneously turns on the high side transistor 132 by asserting the gate voltage on the high side transistor 132 and turns off the low side transistor 134 by negating the gate voltage on the low side transistor 134. Conversely, when controller 110 generates a logic low value for the output signal PWM 122, controller 110 simultaneously turns off the high side transistor 132 by negating the gate voltage on the high side transistor 132 and turns on the low side transistor 134 by asserting the gate voltage on the low side transistor 134.

Due to the switching control from controller 110, in some embodiments, the signal on node 136 is a square waveform with a peak value of VIN 130 and a low value of the ground reference. The signal VOUT 162 is a filtered version of the signal on node 136 and also dependent on the duty cycle of the signal on node 136. For example, if the power supply VIN 130 has a value of 5 volts (V) and the controller 110 generates a square waveform for the signal on node 136 with a 20% duty cycle, then the output signal VOUT 162 has a constant value of 1.0V. In another example, if the controller 110 generates a square waveform for the signal on node 136 with a 10% duty cycle, then the output signal VOUT 162 has a constant value of 0.5V. The inductor 150 and the capacitor 160 are used as a low pass filter that provides an average voltage value on the node 136 as the output VOUT 162. In an embodiment, controller 110 receives feedback information from current feedback block 170 and the output voltage VOUT 162 in addition to control signals (not shown) from an external power management unit. The received information is used by controller 110 to determine the duty cycle and the resulting value for VOUT 162.

In addition to being sent to one or more components, the output voltage VOUT 162 is sent to error amplifier 102 within controller 110 as feedback voltage 164. In some embodiments, feedback voltage 164 is equal to the output voltage VOUT 162. In other embodiments, a voltage divider is used to create feedback voltage 164 from the output voltage VOUT 162. A reference voltage 104 is received and compared against the feedback voltage 164. In an embodiment, error amplifier 102 is an operational transconductance amplifier (OTA) generating an output current 106 based on a differential input voltage.

In some embodiments, the generated output current 106 is sent to the PWM comparator 120. In other embodiments, one or more passive elements are used to convert the generated output current to a voltage value 106 received by the PWM comparator 120. In one embodiment, the output 106, which is one of the generated output current and the converted voltage, from error amplifier 102 is used to set a threshold for the PWM comparator 120 to determine which of the two power transistors 132 and 134 to turn on. This decision determines the duty cycle of the node 136 and the output voltage VOUT 162. When the other input of the PWM comparator 120 exceeds the threshold, the PWM comparator generates a logic low value for the PWM signal 122, which turns on the high side power transistor 132. In an embodiment, controller 110 uses a set-reset (SR) latch and one or more buffers between PMW comparator 120 and the PMW signal 122.

The current feedback block 170 includes a current sense amplifier (not shown), which receives the inductor current IL 152 and generates a sensing current as a scaled down version of the inductor current IL 152 to be sent to one or more comparators. In some embodiments, the sensing current is equal to the inductor current divided by the factor K. In one example, when K is 1,000 and the inductor current is 3 amperes (A), the sensing current is 3 milliamperes (mA). The outputs of the one or more comparators are sent to controller 110. In one embodiment, the generated sensing current is sent on node 108 to the PWM comparator 120. In another embodiment, one or more passive elements are used to convert the generated sensing current to a voltage, and the converted voltage is sent on node 108 to the PWM comparator 120. In other embodiments, the current-to-voltage conversion is performed within controller 110.

As described earlier, the average value of the inductor current IL 152 is the value of the load current supplied to one or more components. When the load current drawn by the one or more components changes while the output voltage VOUT 162 should remain at a relatively same value, the inductor current IL 152 also changes, which is monitored by a current feedback block 170. The clock period is divided into a high phase and a low phase with one of the phases being a relatively short phase. During the relatively short phase, one or more components, such as the current sense amplifier within the current feedback block 170, does not have sufficient time to start, generate the sensing current from the inductor current IL 152, perform any current-to-voltage conversions and send information to controller 110 in the limited time. Therefore, control logic in one of the current feedback block 170 and controller 110 selects between two sources for providing an input to the PWM comparator 120.

In one embodiment, the above control logic for selecting between two sources is located in the current feedback block 170. The control logic selects a first voltage generated from the output of the current sense amplifier to send to the PWM comparator 120, when the control logic determines the power converter 100 is in the long phase of the clock period. However, when the control logic determines the power converter 100 is in the relatively short phase of the clock period, the control logic selects a second voltage from a voltage generator to send to the PWM comparator 120 in controller 110. Therefore, the current sense amplifier is not relied upon during the relatively short phase. Rather, an emulated voltage ramp mimics the slope of the inductor current IL 152 during the relatively short phase. In various embodiments, the voltage generator is a current source connected in series with a capacitor. The current source charges the capacitor to generate the second voltage. The current source generates a current proportional to a difference between the input voltage VIN 130 and the output voltage VOUT 162.

Figure 2:
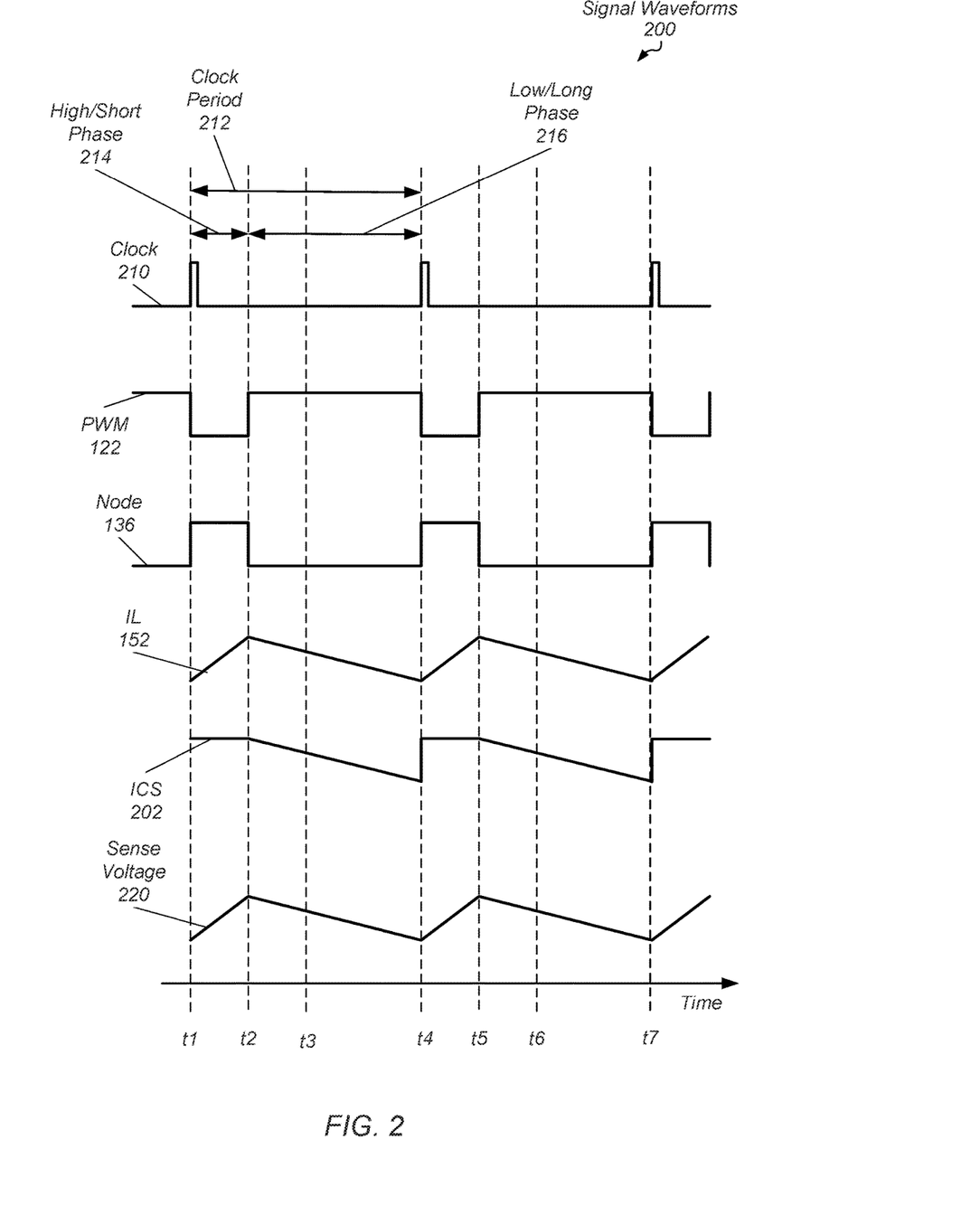
FIG. 2 is a block diagram of one embodiment of signal waveforms during operation of a power converter.

Turning now to FIG. 2, a generalized block diagram of one embodiment of signal waveforms 200 during operation of a power converter is shown. In the illustrated embodiment, signal waveforms described earlier are numbered identically. In various embodiments, the clock signal 210 has a fixed frequency. Accordingly, the clock signal 210 has a fixed clock period 212. The clock period 212 fits between time t1 and time t4. The clock period 212 is divided into a relatively short phase 214 and a long phase 216. The short phase 214 is between time t1 and time t2. The long phase is between time t2 and t4. In the illustrated embodiment, the long phase 216 is approximately three quarters of the clock period 212 and the short phase 214 is approximately one quarter of the clock period 212 although other ratios are possible and contemplated. As shown, each of the signals PWM 122 and node 136 is a square wave alternating between the value of the power supply VIN 130 and the ground reference.

When the rising edge of the clock signal 210 is reached, the PWM signal 122 transitions from a logic high value to a logic low value. As a result, the low side power transistor 134 turns off and the high side power transistor 132 turns on. Accordingly, the signal on node 136 transitions from a logic low value to a logic high value and remains at the logic high value between time t1 and time t2. The duty cycle of the signal on node 136 is shown as being less than half. Since the signal on node 136 is at a logic high value during the short phase 214, the duty cycle is approximately 25%. For example, the signal on node 136 is at a logic high value between time t1 and time t2 and between time t4 and time t5.

As described earlier, the output of the power converter 100, which is the signal VOUT 162 (not shown here) is an average of the voltage signal on node 136 due to the low pass filter created by the pair of the inductor 150 and the capacitor 160. Therefore, the output signal VOUT 162 is the multiplicative product of the peak voltage for the signal on node 136 and the duty cycle of the signal on node 136. In order to generate the non-zero, positive load current, the power converter 100 generates the inductor current IL 152. As described earlier, the average value of the inductor current IL 152 is the value of the supplied load current. Therefore, the average value of the triangular waveform for the inductor current IL 152 is the value of the supplied load current. Accordingly, the peak of the inductor current IL 152 exceeds the value of the supplied load current and the valley (lowest value) of the inductor current IL 152 is below the value of the supplied load current.

As shown, between time t1 and t2, which is the short phase 214 when the high side transistor 132 is turned on and the low side transistor 134 is turned off, the inductor current IL 152 ramps up. Between time t2 and t4, which is the long phase 216 when the high side transistor 132 is turned off and the low side transistor 134 is turned on, the inductor current IL 152 ramps down. The alternating of the ramping up and the ramping down repeats for the inductor current IL 152. For example, between time t4 and t5, the inductor current IL 152 again ramps up.

As described earlier, during the relatively short phase 214, the current sense amplifier within the current feedback block 170 does not have sufficient time to start, generate the sensing current from the inductor current IL 152, perform any current-to-voltage conversions and send information to controller 110 in the limited time. The generated sensing current is shown as ICS 202. During the short phase 214 between times t1 and t2 and additionally between times t4 and t5, the sensing current ICS 202 is reset to a direct current (DC) non-zero, positive value. As can be seen in FIG. 2, the sensing current ICS 202 is a constant, horizontal voltage value between times t1 and t2 and between times t4 and t5. A voltage value generated from ICS 202 during the short phase 214 accordingly has a constant value too. In contrast, during the long phase between times t2 and t4 and additionally between times t5 and t7, the sensing current ICS 202 tracks the inductor current IL 152.

Rather than use a default non-zero voltage value during the short phase 214 for the input to the PWM comparator, control logic selects a second voltage value. The second voltage value is from a voltage generator. In various embodiments, the voltage generator is a current source connected in series with a capacitor. The current source charges the capacitor to generate the second voltage. The current source generates a current proportional to a difference between the input voltage VIN 130 and the output voltage VOUT 162. Therefore, the current sense amplifier is not relied upon during the relatively short phase 214. Rather, an emulated voltage ramp mimics the slope of the inductor current IL 152 during the relatively short phase 214.

Between the times t1 and t2 during the short phase 214, the emulated voltage ramp is shown for the sense voltage 220. The slope of the sense voltage 220 is relatively the same as the slope of the inductor current IL 152. Between the times t2 and t4 during the long phase 216, the output of the current sense amplifier is selected and provides the sense voltage 220. Again, the slope of the sense voltage 220 is relatively the same as the slope of the inductor current IL 152. During the long phase 216, the sense voltage 220 is generated from the sensing current ICS 202, which is a scaled down version of the inductor current IL 152. In some embodiments, during the long phase, such as between times t2 and t4, the sensing current ICS 202 is equal to the inductor current IL 152 divided by the factor K. In one example, when K is 1,000 and the inductor current IL 152 is 3 amperes (A), the sensing current ICS 202 is 3 milliamperes (mA). During the short phase 214, such as between times t1 and t2, the sense voltage 220 is generated from the voltage generator mimicking the inductor current IL 152.

Figure 3:
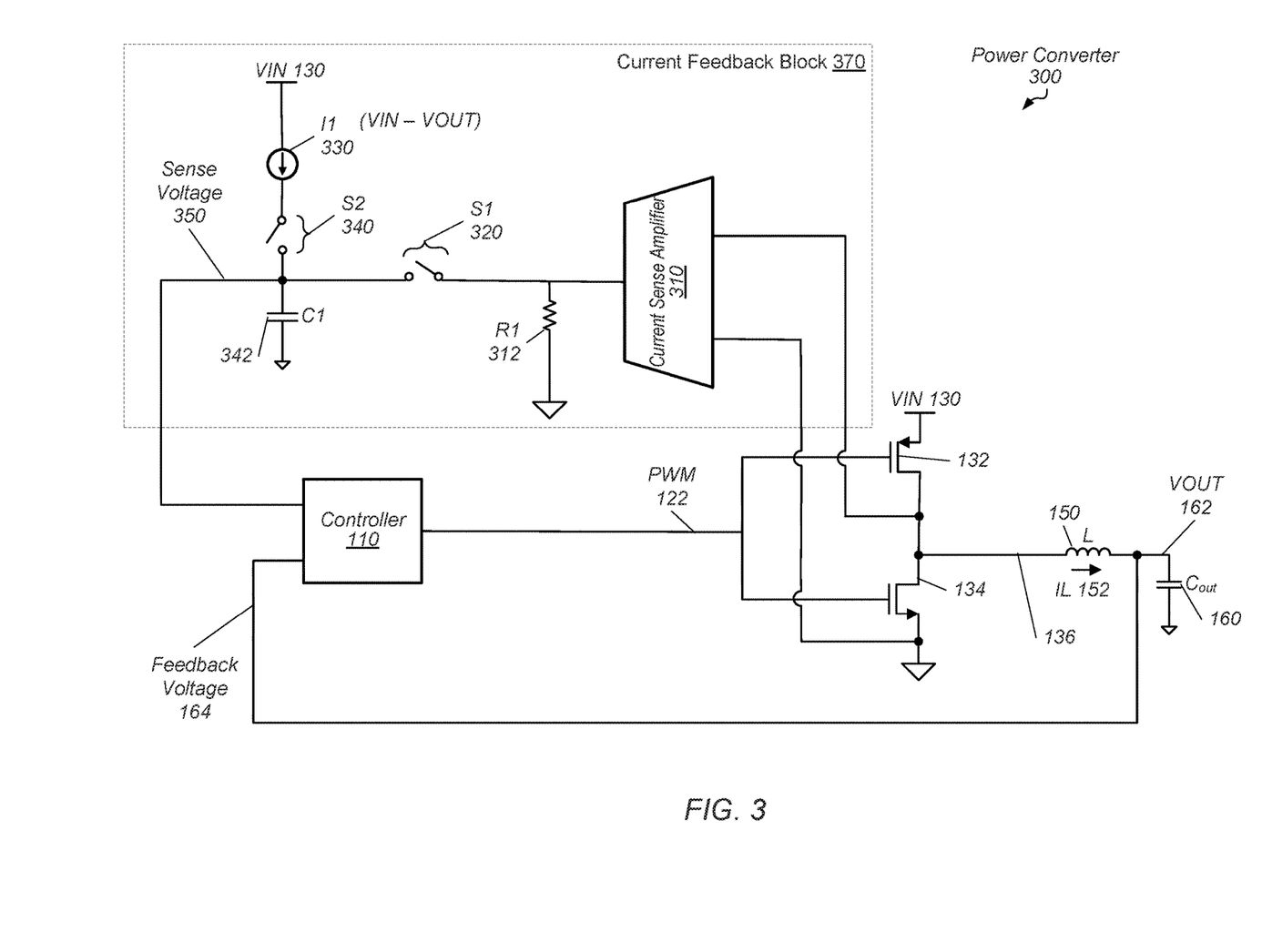
FIG. 3 is a block diagram of another embodiment of a power converter.

Referring to FIG. 3, a generalized block diagram of another embodiment of a power converter 300 is shown. Control logic and circuitry described earlier are numbered identically. As shown, the current feedback block 370 includes a current sense amplifier 310, a resistor R1 312, switches S1 320 and S2 340, current source I1 330 and capacitor C1 342. The inductor current IL 152 is translated into a ramp voltage signal by the current sense amplifier 310. The ramp voltage represents the inductor current IL 152. In some embodiments, the ramp voltage also represents a compensation ramp signal combined with the inductor current IL 152. The sense voltage 350 is generated either from the current sense amplifier 310 or from the voltage generator, which includes the current source I1 330 and the capacitor C1 342. The sense voltage 350 is sent to the PWM comparator in controller 110, forming an inner current control loop.

As shown, when switch S1 320 is closed and switch S2 340 is open, the sense voltage 350 receives the output from the current sense amplifier 310. Control signals may be set to open and close the switches in this manner when control logic determines the power converter 300 is in the long phase of the clock period. In contrast, when switch S1 320 is open and switch S2 340 is closed, the sense voltage 350 receives the output on the capacitor C1 342 charged by the current source I1 330. Control signals may be set to open and close the switches in this manner when control logic determines the power converter 300 is in the short phase of the clock period.

Figure 4:
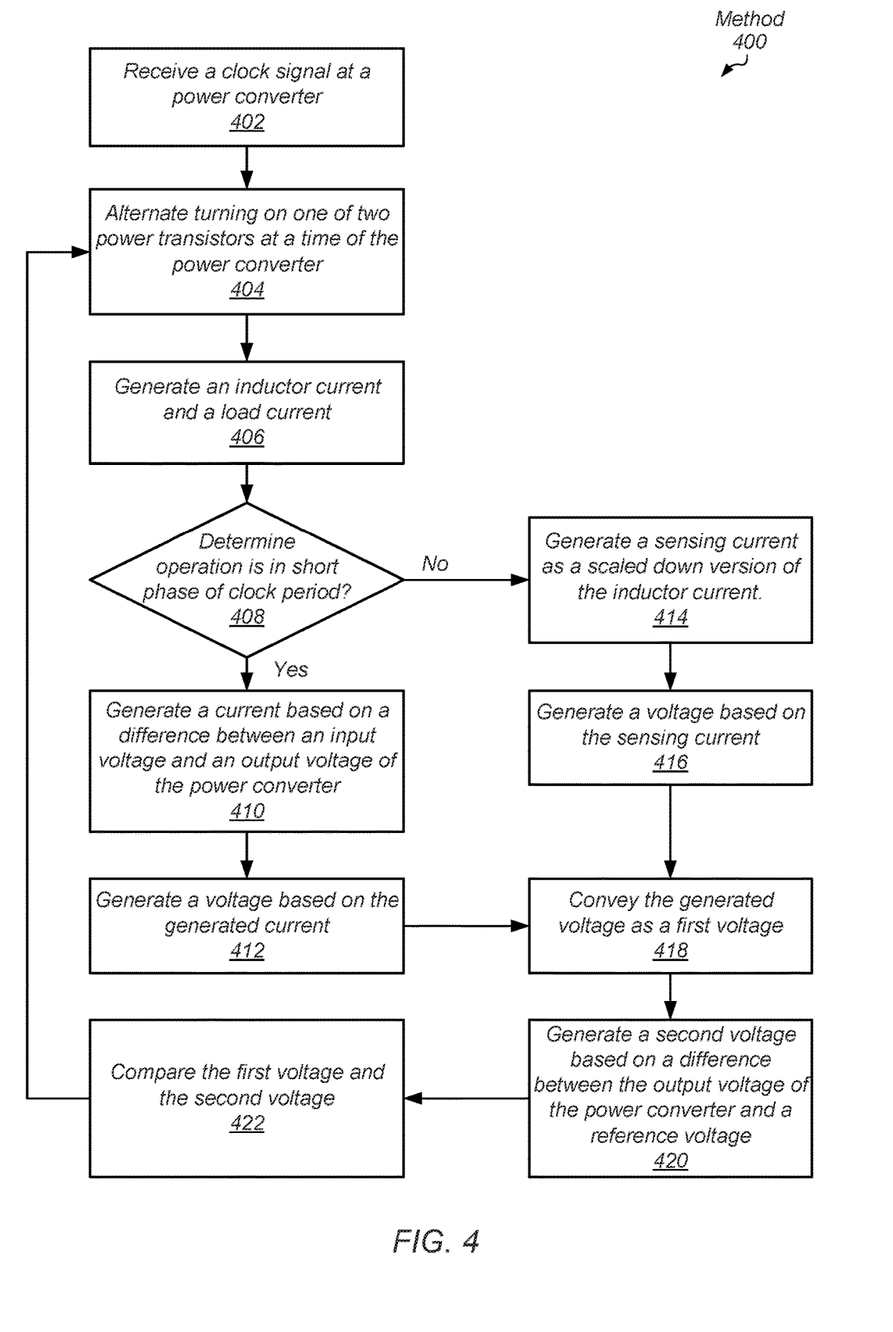
FIG. 4 is a flow diagram of one embodiment of a method for efficiently generating a stable output voltage for one or more components by checking feedback information for an entire clock period.

Referring now to FIG. 4, a generalized flow diagram of one embodiment of a method 400 for efficiently generating a stable output voltage for one or more components by checking feedback information for an entire clock period is shown. For purposes of discussion, the steps in this embodiment are shown in sequential order. However, in other embodiments some steps may occur in a different order than shown, some steps may be performed concurrently, some steps may be combined with other steps, and some steps may be absent.

A power converter receives a clock signal (block 402). The power converter additionally receives an input voltage and generates an output voltage on a capacitor of a low pass filter. To do so, the power converter alternates turning on one of two power transistors at a time (block 404), which generates an inductor current and a load current for one or more components (block 406). If control logic determines operation is occurring in the short phase of the clock period ("yes" branch of the conditional block 408), then a current is generated based on a difference between an input voltage and an output voltage of the power converter (block 410). A voltage based on the generated current is generated (block 412). In some embodiments, a current source generates the current for charging a capacitor, which generates the voltage. The generated voltage is conveyed to a PWM comparator in a controller as a first voltage (block 418).

If control logic determines operation is occurring in the long phase of the clock period ("no" branch of the conditional block 408), then a sensing current is generated as a scaled down version of the inductor current (block 414). A scaled down version of the inductor current is a current equal to the inductor current divided by the factor K. In one example, when K is 1,000 and the inductor current is 3 amperes (A), the sensing current is 3 milliamperes (mA). A voltage is generated based on the sensing current (block 416). In some embodiments, one or more passive elements are used to convert the sensing current to a voltage value. The generated voltage is conveyed to a PWM comparator in a controller as a first voltage (block 418). Therefore, the value of the first voltage sent to the PWM comparator is based on whether operation is occurring in the short phase or the long phase of the clock period.

A second voltage is generated based on a difference between the output voltage of the power converter and a reference voltage (block 420). In some embodiments, an operational transconductance amplifier (OTA) is used to generate an output current based on the differential input voltage and one or more passive elements are used to convert the output current to the second voltage. The first voltage is compared to the second voltage (block 422). In various embodiments, a PWM comparator compares the first voltage and the second voltage. The result of the comparison determines which of the two power transistors is turned on. Control flow of method 400 returns to block 404 where the power converter alternates turning on one of two power transistors at a time.

Figure 5:
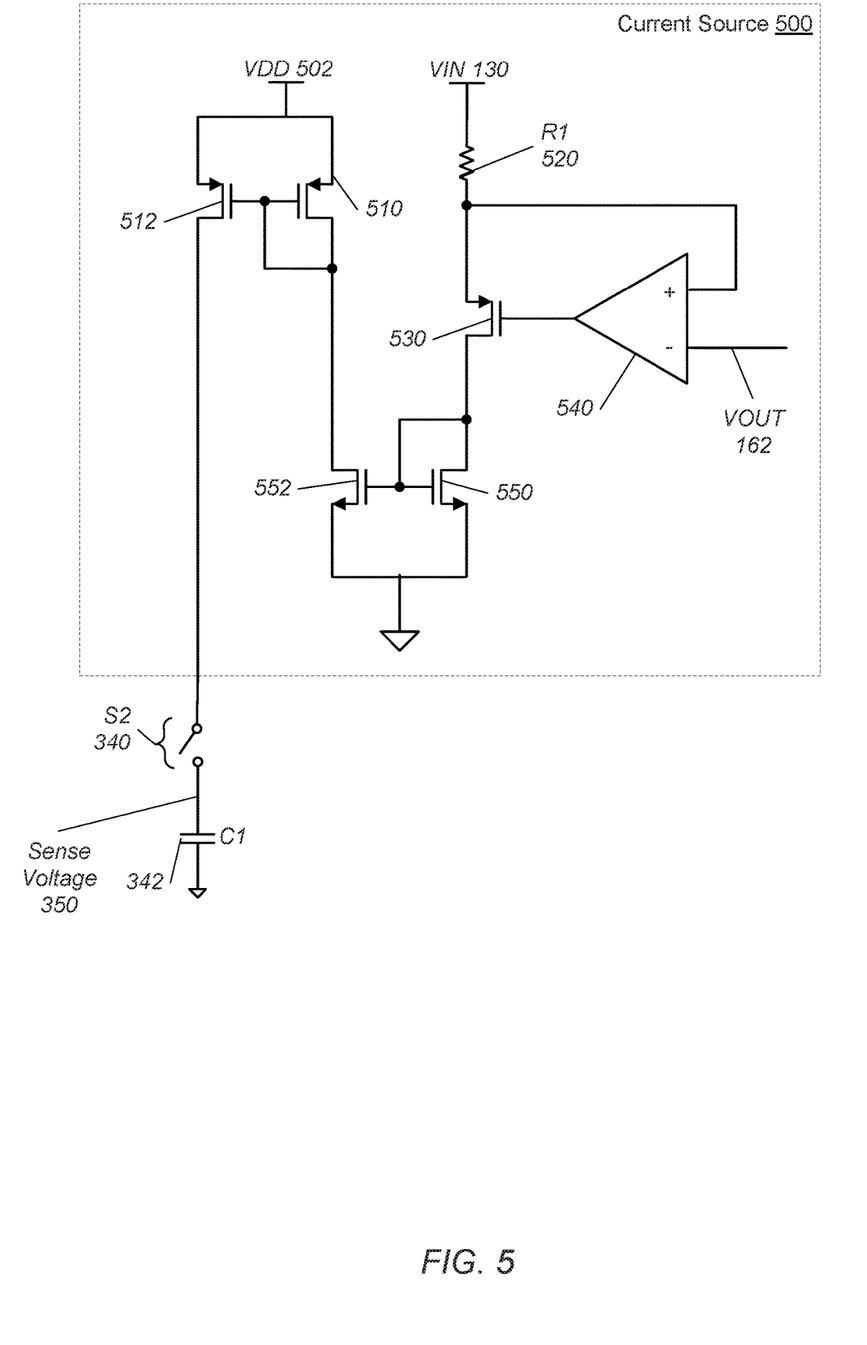
FIG. 5 is a block diagram of one embodiment of a current source.
Figure 6:
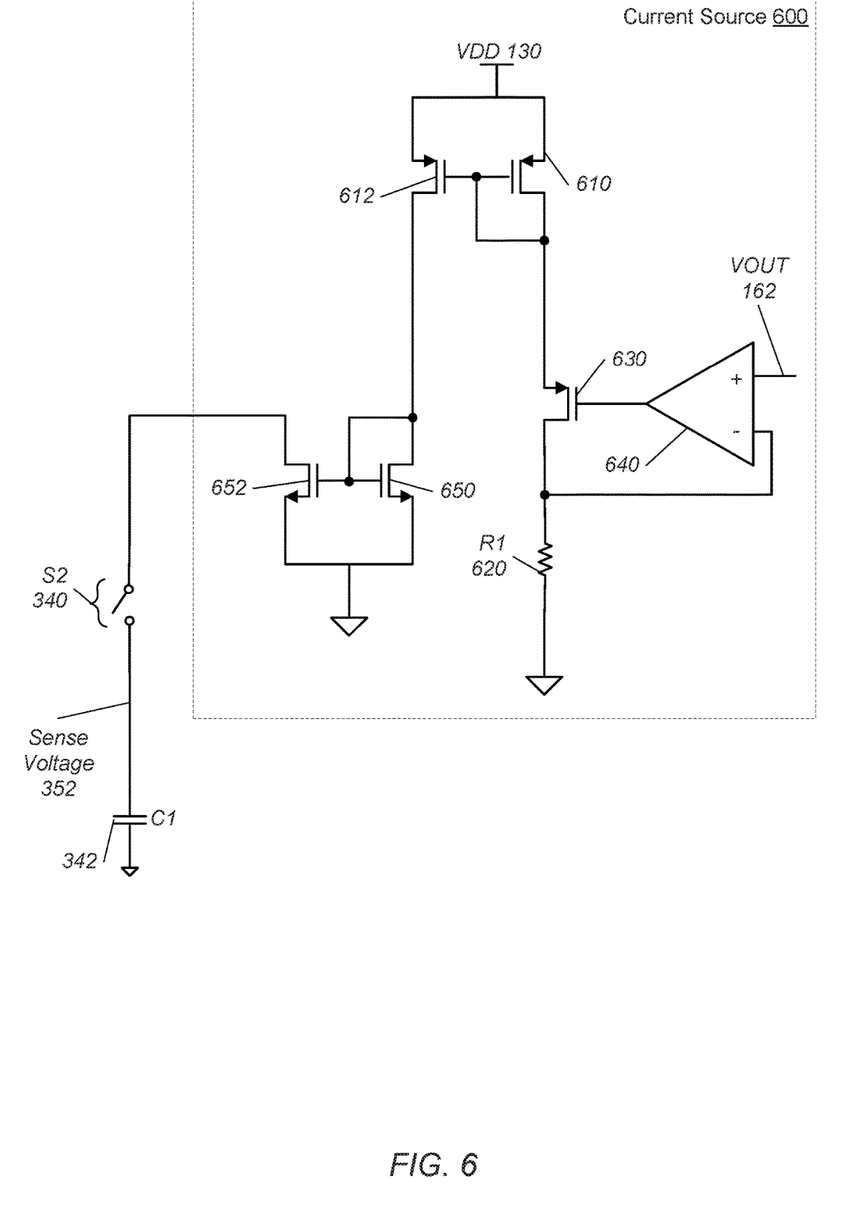
FIG. 6 is a block diagram of another embodiment of a current source.

Turning now to FIG. 5, a generalized block diagram of one embodiment of a current source 500 is shown. Circuitry and signals described earlier are numbered identically. As shown, current source 500 generates a current to flow through switch S2 340 to charge the capacitor C1 342 to the sense voltage 350. The amount of current is based on the difference between the input voltage VIN 130 and the output voltage VOUT 162. In various embodiments, the current source 500 is selected when the current sense amplifier measures the current through the low-side power transistor 134. Therefore, the long phase of the clock period is also the low phase. It is noted current source 500 (as well as current source 600) is one embodiment for generating a current proportional to the difference between the input voltage VIN 130 and the output voltage VOUT 162. Other embodiments of current sources for generating current, which is proportional to the difference between the input voltage VIN 130 and the output voltage VOUT 162, are possible and contemplated.

In some embodiments, the amplifier 540 is an amplifier generating an output voltage based on its differential input voltage. In other embodiments, the amplifier 540 is an OTA generating an output current based on its differential input voltage and one or more passive elements are used to convert the output current to a voltage value. The amplifier 540 receives the output voltage VOUT 162 as one input. Additionally, the amplifier 540 receives a value equal to the difference between the input voltage VIN 130 and the voltage drop across the resistor R1 520 as a second input. The generated output voltage is received on the gate terminal of the transistor 530, which is shown as an nfet.

The drain terminal of the transistor 530 is connected to the resistor R1 520. The source terminal is connected to the drain terminal of the diode-connected transistor 550. The transistors 550 and 552 form a current mirror. Each of the transistors 550 and 552 is an nfet. The transistor 552 is the current sink transistor of the current mirror. When the device widths of the diode-connected transistor 550 of the current mirror and the current sink transistor 552 of the current mirror match, the sensing current flowing through the transistor 552 equals the reference current flowing through the diode-connected transistor 550. With a non-unity ratio between the device widths, the sensing current is a scaled version of the reference current based on the non-unity ratio.

The drain terminal of the transistor 552 is connected to the drain terminal of the diode-connected transistor 510, which is a pfet. The transistors 510 and 512 form a second current mirror. Each of the transistors 510 and 512 is a pfet. The transistor 512 is the current sink transistor of the current mirror. The drain terminal of the transistor 512 is connected to the switch S2 340. Similar to the first current mirror, when the device widths of the diode-connected transistor 510 of the current mirror and the current sink transistor 512 of the current mirror match, the sensing current flowing through the transistor 512 equals the reference current flowing through the diode-connected transistor 510. With a non-unity ratio between the device widths, the sensing current is a scaled version of the reference current based on the non-unity ratio.

Referring to FIG. 6, a generalized block diagram of one embodiment of a current source 600 is shown. Circuitry and signals described earlier are numbered identically. As shown, current source 600 generates a current to flow through switch S2 340 from the capacitor C1 342. In various embodiments, the current source 600 is selected when the current sense amplifier measures the current through the high-side power transistor 132. Therefore, the long phase of the clock period is also the high phase.

Similar to the current source 500, the current source 600 includes an amplifier 640, which generates an output voltage on the gate terminal of the pfet 630 based on its input differential voltage. The amplifier 640 receives the output voltage VOUT 162 as one input. Additionally, the amplifier 640 receives a value equal to the voltage drop across the resistor R1 620 as a second input. The source terminal of the pfet 630 is connected to the drain terminal of the diode-connected pfet transistor 610.

The pfet 612 is the current sink transistor of the current mirror formed with the diode-connected pfet transistor 610. The ratio of the device widths between transistors 610 and 612 determines the ratio of the output current flowing through pfet 612 compared to the reference current flowing through pfet 610. The drain terminal of the nfet 650 is connected to the drain terminal of the pfet 612. The output current of the current mirror turns on the pfet 650, which also turns on nfet 652. When the switch S2 340 is closed, the capacitor C1 342 discharges through nfet 652 to the ground reference.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A current feedback circuit comprising:
   a current sense amplifier configured to generate a first voltage based on a measured current through a power transistor of a power converter;
   a first switch coupled to receive an output of the current sense amplifier;
   a resistor with a first terminal coupled between the output of the current sense amplifier and the first switch, and a second terminal coupled to a ground node;
   a voltage generator configured to generate a second voltage; and
   control logic configured to:
      convey the first voltage and not the second voltage to an external pulse width modulator comparator for comparison with an output voltage of an external error amplifier, in response to determining the power converter is in a long phase of a duty cycle; and
      convey the second voltage and not the first voltage to the external pulse width modulator comparator for comparison with the output voltage of the external error amplifier, in response to determining the power converter is in a short phase of a duty cycle.

2. The current feedback circuit as recited in claim 1, wherein the voltage generator comprises a current source connected in series with a capacitor, wherein the current source charging the capacitor generates the second voltage.

3. The current feedback circuit as recited in claim 2, wherein the current source is configured to generate a current proportional to a difference between an input voltage of the power converter and the output voltage of the power converter.

4. The current feedback circuit as recited in claim 1, wherein the current sense amplifier is configured to:
   generate a sensing current as a scaled down version of the measured current, wherein the measured current is an inductor current of the power converter; and
   generate the first voltage based on the sensing current.

5. The current feedback circuit as recited in claim 1, wherein the first switch is further coupled to an input of the pulse width modulator comparator, wherein the control logic is further configured to close the first switch in response to determining the power converter is in the long phase of the duty cycle.

6. The current feedback circuit as recited in claim 5, further comprising a second switch between an output of the current source and an input of the capacitor, wherein the control logic is further configured to close the second switch in response to determining the power converter is in the short phase of the duty cycle.

7. A method comprising:
   generating, by a current sense amplifier, a first voltage based on a measured current through a power transistor of a power converter;
   receiving, by a first switch, an output of the current sense amplifier;
   receiving, by a first terminal of a resistor, the output of the current sense amplifier, wherein the first terminal of the resistor is coupled between the output of the current sense amplifier and the first switch, and a second terminal of the resistor is coupled to a ground node;
   generating a second voltage with a voltage generator;
   conveying the first voltage and not the second voltage to a pulse width modulator comparator for comparison with an output voltage of an error amplifier, in response to determining the power converter is in a long phase of a duty cycle; and
   conveying the second voltage and not the first voltage to the pulse width modulator comparator for comparison with the output voltage of the error amplifier, in response to determining the power converter is in a short phase of a duty cycle.

8. The method as recited in claim 7, wherein the voltage generator comprises a current source connected in series with a capacitor, wherein the current source charging the capacitor generates the second voltage.

9. The method as recited in claim 8, generating with the current source a current proportional to a difference between an input voltage of the power converter and the output voltage of the power converter.

10. The method as recited in claim 7, further comprising:
    generating a sensing current as a scaled down version of the measured current, wherein the measured current is an inductor current of the power converter; and
    generating the first voltage based on the sensing current.

11. The method as recited in claim 10, further comprising closing a first switch in response to determining the power converter is in the long phase of the duty cycle, wherein the first switch is between an output of the current sensing amplifier and an input of the PWM comparator.

12. The method as recited in claim 11, further comprising closing a second switch in response to determining the power converter is in the short phase of the duty cycle, wherein the second switch is between an output of the current source and an input of the capacitor.

13. The method as recited in claim 12, further comprising:
    opening the first switch in response to determining the power converter is in the short phase of the duty cycle; and
    opening the second switch in response to determining the power converter is in the long phase of the duty cycle.

14. A power converter comprising:
    two power transistors connected in series with an output connected to a switching node;
    a controller configured to turn on and off the two power transistors to change a voltage of a switching node input of a low pass filter;

a current feedback circuit configured to convey a voltage based at least upon an inductor current flowing in the low pass filter to a pulse width modulator comparator in the controller, wherein the current feedback circuit comprises:
  a current sense amplifier configured to generate a first voltage based on a measured current through a power transistor of the two power transistors;
  a first switch coupled to receive an output of the current sense amplifier;
  a resistor with a first terminal coupled between the output of the current sense amplifier and the first switch, and a second terminal coupled to a ground node;
  a voltage generator configured to generate a second voltage; and
  control logic configured to:
    convey the first voltage and not the second voltage to a pulse width modulator comparator for comparison with an output voltage of an error amplifier, in response to determining the power converter is in a long phase of a duty cycle; and
    convey the second voltage and not the first voltage to the pulse width modulator comparator for comparison with the output voltage of the error amplifier, in response to determining the power converter is in a short phase of a duty cycle.

15. The power converter as recited in claim 14, wherein the voltage generator comprises a current source connected in series with a capacitor, wherein the current source charging the capacitor generates the second voltage.

16. The power converter as recited in claim 15, wherein the current source is configured to generate a current proportional to a difference between an input voltage of the power converter and the output voltage of the power converter.

17. The power converter as recited in claim 14, wherein current sense amplifier configured to:
  generate a sensing current as a scaled down version of the measured current, wherein the measured current is an inductor current of the power converter; and
  generate the first voltage based on the sensing current.

18. The power converter as recited in claim 14, wherein the first switch is further coupled to an input of the pulse width modulator comparator, wherein the control logic is further configured to close the first switch in response to determining the power converter is in the long phase of the duty cycle.

19. The power converter as recited in claim 18, wherein the current feedback circuit further comprises a second switch between an output of the current source and an input of the capacitor, wherein the control logic is further configured to close the second switch in response to determining the power converter is in the short phase of the duty cycle.

20. The power converter as recited in claim 19, wherein the control logic is further configured to:
  open the first switch in response to determining the power converter is in the short phase of the duty cycle; and
  open the second switch in response to determining the power converter is in the long phase of the duty cycle.

* * * * *